(12) United States Patent
Park et al.

(10) Patent No.: US 9,368,804 B2
(45) Date of Patent: Jun. 14, 2016

(54) SCHEELITE-STRUCTURED COMPOSITE METAL OXIDE WITH OXYGEN IONIC CONDUCTIVITY

(71) Applicant: Samsung Electronics Co., Ltd., Suwon-si, Gyeonggi-do (KR)

(72) Inventors: Hee-jung Park, Suwon-si (KR); Chan Kwak, Yongin-si (KR); Sung-jin Ahn, Anyang-si (KR); Doh-won Jung, Seoul (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 155 days.

(21) Appl. No.: 13/947,273

(22) Filed: Jul. 22, 2013

(65) Prior Publication Data

US 2014/0234752 A1 Aug. 21, 2014

(30) Foreign Application Priority Data

Feb. 21, 2013 (KR) .................. 10-2013-0018832

(51) Int. Cl.
*H01M 4/48* (2010.01)
*H01M 4/90* (2006.01)
(Continued)

(52) U.S. Cl.
CPC ............ *H01M 4/9033* (2013.01); *C01G 39/006* (2013.01); *H01M 8/1213* (2013.01); *H01M 8/1246* (2013.01); *C01P 2002/72* (2013.01); *C01P 2004/03* (2013.01); *C01P 2006/40* (2013.01); *H01M 2300/0074* (2013.01); *Y02E 60/521* (2013.01); *Y02E 60/525* (2013.01); *Y02P 70/56* (2015.11)

(58) Field of Classification Search
CPC . H01M 4/9033; H01M 4/485; H01M 8/1246; Y02E 60/525; Y02E 60/122; Y02E 60/521
USPC ............... 429/489, 495; 252/62.3 ZT, 519.1, 252/519.15
See application file for complete search history.

(56) References Cited

U.S. PATENT DOCUMENTS 6,165,796 A   12/2000 Bell
6,582,530 B1   6/2003 Hanlon et al.
6,893,760 B2 * 5/2005 Shibata et al. ................ 429/487
(Continued)

FOREIGN PATENT DOCUMENTS

KR   100638888 B1   10/2006
KR   10-0729114 B1   6/2007
WO   2012021239 A2   2/2012

OTHER PUBLICATIONS

Jihai Cheng et al. A novel electrolyte for intermidiate solid oxide fuel cell, 2010, Journal of Power Sources 195 (2010) 1849-1853.*
(Continued)

*Primary Examiner* — Gary Harris
(74) *Attorney, Agent, or Firm* — Cantor Colburn LLP

(57) ABSTRACT

A composite metal oxide represented by the formula $$M^a{}_{1-x}M^b{}_xM^cO_{4+x/2},$$

wherein $M^a$ is at least one element selected from alkaline earth metals, $M^b$ is at least one element selected from lanthanoids, $M^c$ is at least one element selected from Mo and W, and x is from about 0.1 to about 0.5.

8 Claims, 4 Drawing Sheets

(51) Int. Cl.
*H01M 8/12* (2016.01)
*C01G 39/00* (2006.01)

(56) References Cited

U.S. PATENT DOCUMENTS

| | | | |
|---|---|---|---|
| 6,916,570 | B2 | 7/2005 | Vaughey et al. |
| 7,208,121 | B2 | 4/2007 | Peper et al. |
| 7,476,376 | B2 | 1/2009 | Hong et al. |
| 7,604,892 | B2 | 10/2009 | Yoo et al. |
| 2004/0146783 | A1 | 7/2004 | Alday Lesaga et al. |
| 2007/0113779 | A1* | 5/2007 | Wong et al. ............ 117/84 |

OTHER PUBLICATIONS

Harry L. Tuller, "Oxygen Ion Conduction and Structural Disorder in Conductive Oxides", J. Phys. Chem. Solids, vol. 55, No. 12, 1994, pp. 1393-1404.
Osamu Yamamoto, "Solid oxide fuel cells: fundamental aspects and prospects", Electrochimica Acta 45, 2000, pp. 2423-2435.
Phillippe Lacorre et al "Designing fast oxide-ion conductors based on La2Mo2O9", Nature, vol. 404, Apr. 20, 2000, pp. 856-858.
Stephen J. Skinner et al., "Oxygen ion conductors", Materials Today, Mar. 2003, pp. 30-37.

* cited by examiner

SCHEELITE-STRUCTURED COMPOSITE METAL OXIDE WITH OXYGEN IONIC CONDUCTIVITY

CROSS-REFERENCE TO RELATED APPLICATIONS

This application claims priority to and the benefit of Korean Patent Application No. 10-2013-0018832, filed on Feb. 21, 2013, and all the benefits accruing therefrom under 35 U.S.C. §119, the content of which is incorporated herein in its entirety by reference.

BACKGROUND

1. Field

The present disclosure relates to materials with oxygen ionic conductivity, and more particularly, to a composite metal oxide with oxygen ionic conductivity. The composite metal oxide with oxygen ionic conductivity, for example, may be used as solid electrolyte and electrode material of a solid oxide fuel cell ("SOFC"). For other example, the composite metal oxide with oxygen ionic conductivity may be used in an oxygen sensor, an oxygen pump, and an oxygen permeating membrane.

2. Description of the Related Art

An SOFC unit cell includes a solid electrolyte and an electrode. Accordingly, the electrical characteristics of the solid electrolyte and the electrode are closely related to the performance of the SOFC. In particular, the ionic conductivity of the solid electrolyte and the ionic conductivity of the electrode material are important factors that determine the ohmic resistance and polarization resistance of the SOFC unit cell. Therefore, research has focused on the development of ion conductive materials for decades. Mixed oxides which have been suggested as materials for the solid electrolyte and electrode material of an SOFC usually have high electron mobility and high hole mobility but low oxygen ion mobility. Thus, only few materials with suitable ion conductivity have been discovered. Some materials with high ionic conductivity include those having a fluorite structure such as YSZ (yttria-stabilized zirconia: Y-doped $ZrO_2$), CSZ (Ca-doped $ZrO_2$), and GDC (Gd-doped $CeO_2$). Other materials with high ionic conductivity include those having a Perovskite structure such as LSGM (Sr, Mg-doped $LaGaO_3$).

Thus, there remains an unmet need for materials having improved oxygen ion conductivity.

SUMMARY

According to an aspect, the present disclosure provides a composite metal oxide represented by the formula

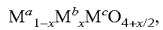

$$M^a{}_{1-x}M^b{}_xM^cO_{4+x/2},$$

wherein $M^a$ is at least one element selected from alkaline earth metals, $M^b$ is at least one element selected from lanthanoids, $M^c$ is at least one element selected from Mo and W, and x is from about 0.1 to about 0.5.

According to another aspect, the present disclosure provides a solid electrolyte layer including a composite metal oxide represented by the formula $$M^a{}_{1-x}M^b{}_xM^cO_{4+x/2},$$

wherein $M^a$ is at least one element selected from alkaline earth metals, $M^b$ is at least one element selected from lanthanoids, $M^c$ is at least one element selected from Mo and W, and x is from about 0.1 to about 0.5.

According to another aspect, the present disclosure provides a reaction barrier layer including a composite metal oxide represented by the formula $$M^a{}_{1-x}M^b{}_xM^cO_{4+x/2},$$

wherein $M^a$ is at least one element selected from alkaline earth metals, $M^b$ is at least one element selected from lanthanoids, $M^c$ is at least one element selected from Mo and W, and x is from about 0.1 to about 0.5.

According to another aspect, the present disclosure provides a fuel cell including a cathode, a solid electrolyte layer, an anode, an optional first reaction barrier layer disposed between the cathode and the solid electrolyte layer, and an optional second reaction barrier layer disposed between the anode and the solid electrolyte layer, wherein at least one of the cathode, the solid electrolyte layer, the anode, the first reaction barrier layer, and the second reaction barrier layer includes a composite metal oxide represented by the formula

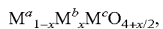

$$M^a{}_{1-x}M^b{}_xM^cO_{4+x/2},$$

wherein $M^a$ is at least one element selected from alkaline earth metals, $M^b$ is at least one element selected from lanthanoids, $M^c$ is at least one element selected from Mo and W, and x is from about 0.1 to about 0.5.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
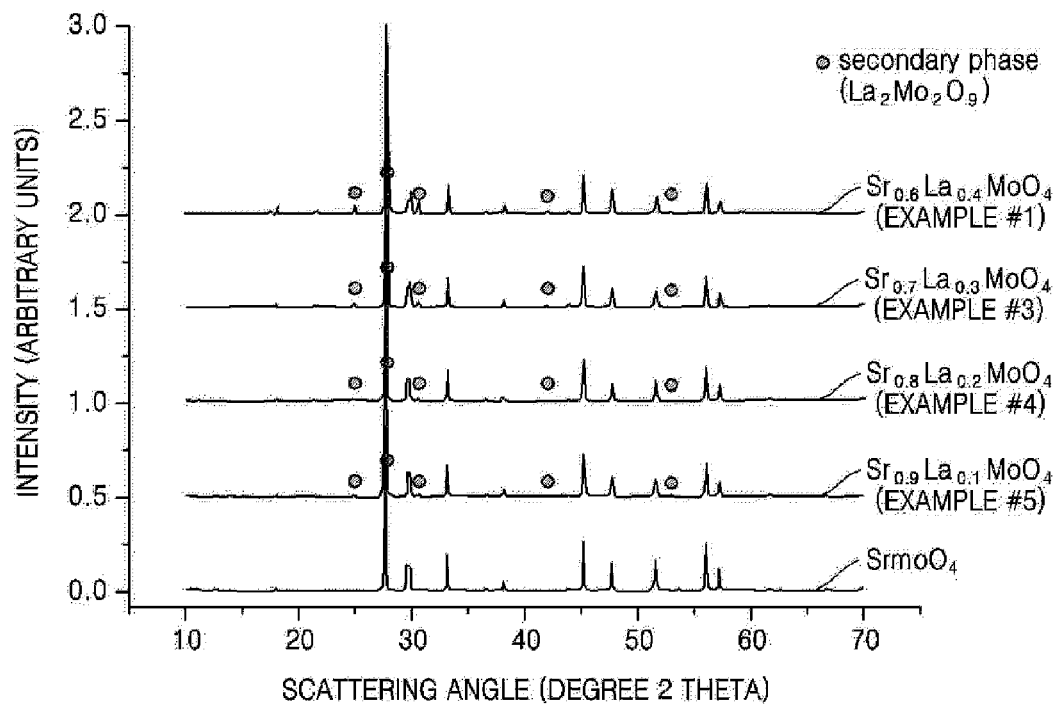
FIG. 1 is a graph of intensity (arbitrary units, a. u.) versus scattering angle (degrees 2 theta) showing an XRD pattern of a calcined composite metal oxide powder according to the Examples of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. The term "or" means "and/or." Expressions such as "at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Additional aspects will be set forth in part in the description which follows and, in part, will be apparent from the description.

In an aspect of the present disclosure, a composite metal oxide is described in further detail as set forth hereunder.

In an embodiment, the present disclosure provides a composite metal oxide represented by the formula

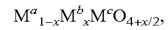

$$M^a{}_{1-x}M^b{}_xM^cO_{4+x/2},$$

wherein $M^a$ is at least one element selected from alkaline earth metals, $M^b$ is at least one element selected from lanthanoids, $M^c$ is at least one element selected from Mo and W, and x is from about 0.1 to about 0.5.

In the present disclosure, $M^a$ is at least one element selected from alkaline earth metals. Alkaline earth metals are elements that belong to Group 2 of the periodic table. Alkaline earth metals include Be, Mg, Ca, Sr, Ba, Ra, and Ubn. In an embodiment, $M^a$ may be at least one element selected from Be, Mg, Ca, Sr, Ba, Ra, and Ubn. In another embodiment, $M^a$ may be at least one element selected from Ca, Sr, and Ba.

In the present disclosure, $M^b$ is at least one element selected from a lanthanoid. Lanthanoid metals are rare earth elements with atomic numbers of from 57 to 71. Lanthanoid metals include La, Ce, Pr, Nd, Pm, Sm, Eu, Gd, Tb, Dy, Ho, Er, Tm, Yb, Lu, etc. In an embodiment, $M^b$ may be at least one element selected from La, Ce, Pr, Nd, Pm, Sm, Eu, Gd, Tb, Dy, Ho, Er, Tm, Yb, and Lu. In another embodiment, $M^b$ may be at least one element selected from La, Pr, Nd, Sm, Eu, and Gd.

In the present disclosure, $M^c$ is at least one element selected from Mo and W. In an embodiment, $M^c$ may be Mo; W; or $Mo_{1-z}W_z$ ($0<z<1$). In another embodiment, z may be from about 0.01 to about 0.50.

In the present disclosure, x is from about 0.1 to about 0.5. While not wanting to be bound by theory, as the value of x increases, a content of the secondary phase (which may be an unintended phase or an undesirable phase) increases. When x is too large the amount of the secondary phase may become undesirable, thereby interconnecting the secondary phases and thus significantly decreasing ionic conductivity. In contrast, when x is too small, the amount of oxygen, which serves as an ion conducting carrier, i.e., the value of (4+x/2), may be insufficient, significantly reducing ionic conductivity.

An embodiment of a composite metal oxide represented by $M^a{}_{1-x}M^b{}_xM^cO_{4+x/2}$ may have a scheelite structure. In a general view, the scheelite structure has a tetragonal structure. In addition, in a local view of the scheelite structure, $MoO_4$ in $SrMoO_4$ form regular tetrahedra wherein Sr is disposed between the $MoO_4$ regular tetrahedrons.

Examples of composite metal oxides with a scheelite structure include $SrMoO_4$, and $SrMoWO_4$. However, these metal oxides do not have suitable ionic conductivity. In an aspect of the present disclosure, the composite metal oxide represented by $M^a{}_{1-x}M^b{}_xM^cO_{4+x/2}$ has a scheelite structure and superior ionic conductivity. While not wanting to be bound by theory, it is believed that the superior ionic conductivity is due to the following reasons: in $SrMoO_4$ not doped with La, the structure of $MoO_4$ is close to a regular tetrahedron, and thus the bond lengths of all four Mo—O bonds are the same. However, after La is doped into $SrMoO_4$, the structure of $MoO_4$ turns into an irregular tetrahedron. Accordingly, an oxygen position with a different energy is generated. Thereby, interstitial oxygen, which is introduced to provide electroneutrality, becomes present within an irregular $MoO_4$ structure; and it is the unstable, charged interstitial oxygen that contributes to ion conductivity.

An embodiment of a solid electrolyte layer according to another aspect of the present disclosure comprises a composite metal oxide represented by the formula $$M^a_{1-x}M^b_xM^cO_{4+x/2},$$

wherein $M^a$ is at least one element selected from alkaline earth metals, $M^b$ is at least one element selected from lanthanoids, $M^c$ is at least one element selected from Mo and W, and x is from about 0.1 to about 0.5.

An embodiment of a reaction barrier layer according to another aspect of the present disclosure comprises a composite metal oxide represented by the formula $$M^a_{1-x}M^b_xM^cO_{4+x/2},$$

wherein $M^a$ is at least one element selected from alkaline earth metals, $M^b$ is at least one element selected from lanthanoids, $M^c$ is at least one element selected from Mo and W, and x is from about 0.1 to about 0.5.

In another aspect, the present disclosure provides a fuel cell including a cathode, a solid electrolyte layer, an anode, an optional first reaction barrier layer disposed between the cathode and the solid electrolyte layer, and an optional second reaction barrier layer disposed between the anode and the solid electrolyte layer, wherein at least one of the cathode, the solid electrolyte layer, the anode, the first reaction barrier layer, and the second reaction barrier layer comprises a composite metal oxide represented by the formula $$M^a_{1-x}M^b_xM^cO_{4+x/2},$$

wherein $M^a$ is at least one element selected from alkaline earth metals, $M^b$ is at least one element selected from lanthanoids, $M^c$ is at least one element selected from Mo and W, and x is from about 0.1 to about 0.5.

In an embodiment, in addition to a fuel cell, the composite metal oxide represented by the formula $M^a_{1-x}M^b_xM^cO_{4+x/2}$ may be applied to provide an oxygen probe, a chemical membrane reactor, an oxygen separation membrane, an oxygen pump, a hydrogen separation membrane, a hydrogen pump, a hydrogen gas sensor, a steam sensor, a hydrocarbon sensor, a hydrogen extraction, a hydrogen pressure controller, isotope enrichment, tritium technology, steam electrolysis, $H_2S$ electrolysis, HCl electrolysis, hydrogenation of a hydrocarbon, dehydrogenation, $NH_3$ formation, and an electrochemical device such as an electrochemical cell, an electrochromic device, or a gas sensor.

Hereinafter, one or more embodiments are described in greater detail using Examples; however, the present disclosure is not limited thereto.

EXAMPLES

Examples 1 to 7

Preparation of Composite Metal Oxides

Composite metal oxides according to an embodiment of the present disclosure were prepared via a conventional ceramic manufacturing process. The composition of the composite metal oxides prepared is shown in Table 1 below.

TABLE 1

| Category | Composition | Abbreviation |
| --- | --- | --- |
| Example 1 | $Sr_{0.90}La_{0.10}MoO_4$ | SLM10 |
| Example 2 | $Sr_{0.85}La_{0.15}MoO_4$ | SLM15 |
| Example 3 | $Sr_{0.80}La_{0.20}MoO_4$ | SLM20 |
| Example 4 | $Sr_{0.70}La_{0.30}MoO_4$ | SLM30 |
| Example 5 | $Sr_{0.60}La_{0.40}MoO_4$ | SLM40 |
| Example 6 | $Sr_{0.50}La_{0.50}MoO_4$ | SLM50 |
| Example 7 | $Sr_{0.50}La_{0.50}Mo_{0.9}W_{0.1}O_4$ | SLMW |

Precursors used in the examples were $SrCO_3$ (99.9 weight %, Aldrich), $La_2O_3$ (99.9 weight %, Aldrich), $MoO_3$ (99.5 weight %, Alfa Aesar) and $WO_3$ (99.99 weight %, Aldrich). The amount of composite metal oxide powders prepared in each example was 10 grams (g). First, the powders of the precursors were weighed based on a molar ratio of metal elements, added along with 40 mL of ethanol into a Nalgene bottle containing zirconia balls, and subjected to a ball milling for 6 hours. Then, the mixed powder was dried in the air, and calcined in the air at 1,000° C. for 3 hours to obtain a composite metal oxide powder with a scheelite structure. The obtained composite metal oxide powder was added into a metal mold and pressed to obtain a composite metal oxide pellet with a diameter of 10 millimeters (mm) and a thickness of 5 mm. Then, cold isostatic pressing ("CIP") was performed to increase the molding density of the composite metal oxide pellet. The pressure during CIP was 200 megaPascals (MPa), which was maintained for 5 minutes. Then, the composite metal oxide pellet was sintered at 1,250° C. for 10 hours for its densification (i.e., increasing of density).

Measurement of Electric Conductivity

The resistance of a sintered composite metal oxide pellet was measured according to 2-probe AC method and 4-probe DC method. The device used for the 2-probe AC method was Model 7260 (Materials Mates Co., Ltd.), and that for the 4-probe DC method was Model 2400 (Keithley Co., Ltd.). The range of frequency used in the 2-probe AC method was from 10 MHz to 1 Hz. The resistance of a specimen was measured while controlling temperature and oxygen partial pressure. The oxygen partial pressure $P_{O2}$ was $10^{-5}$ atm$\leq P_{O2} \leq$1 atm. The oxygen partial pressure was controlled by mixing oxygen gas and nitrogen gas.

Measurement of Electromotive Force (EMF)

In order to identify the charge carrier of a specimen, EMF was measured. First, a composite metal oxide pellet with a diameter of 25 mm and a thickness 1 mm was formed by using the composite metal oxide powders prepared in Examples 1 to 7 using a metal mold. The composite metal oxide pellet was sintered under the same condition as in Examples 1 to 7 to obtain a sintered composite metal oxide pellet. In order to control the gas atmosphere at both ends of the specimen, two alumina tubes were used. At one end of the specimen, the oxygen partial pressure (P1) was maintained at 1 atm using oxygen gas, whereas at the other end, the oxygen partial pressure (P2) was varied from 1 atm to $5\times10^{-4}$ atm. In order to measure EMF, electrodes were formed at both ends of the specimen using Pt-paste, and Pt-wires were connected to the electrodes.

XRD Analysis

Figure 2:
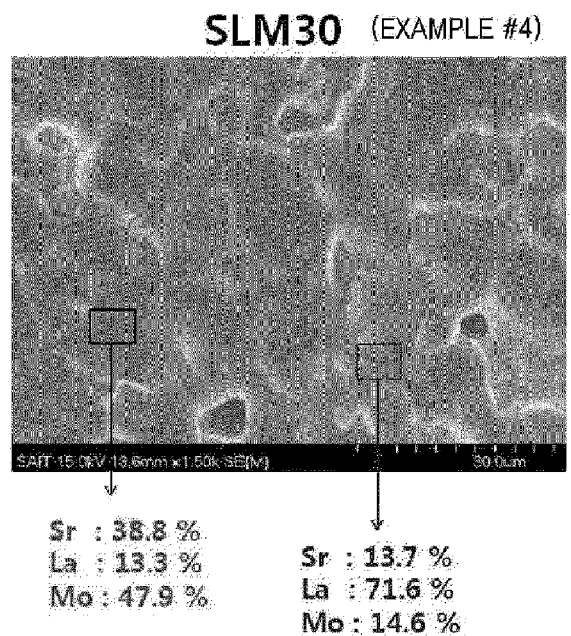
FIG. 2 is a Scanning Electron Microscope ("SEM") image of the calcined composite metal oxide powder ($Sr_{0.70}$ $La_{0.30}$ Mo $O_4$) obtained in Example 4.
Figure 3:
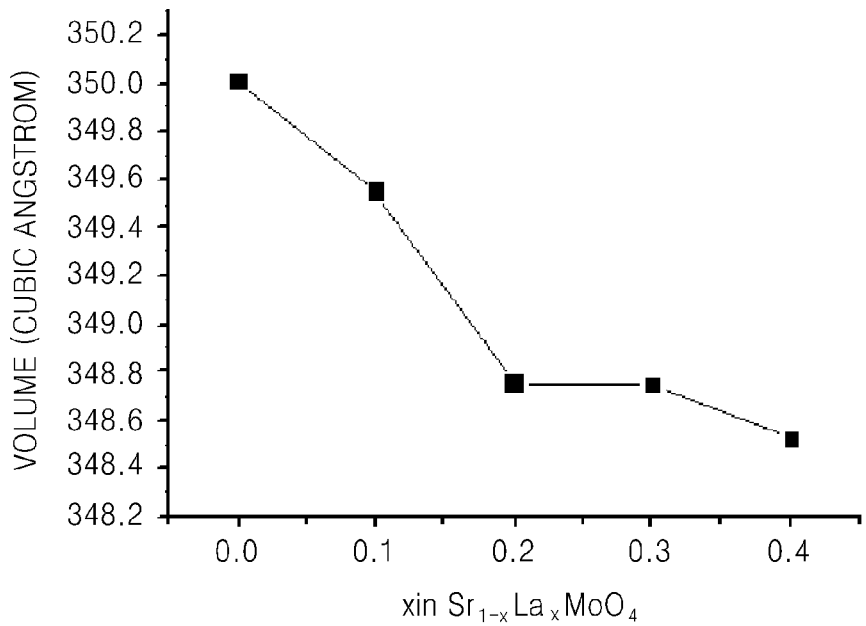
FIG. 3 is a graph of volume (cubic picometers, $pm^3$) of crystal lattice versus x in $Sr_{1-x}La_xMoO_4$, illustrating the volume of crystal lattice calculated from the peak location in the XRD pattern of FIG. 1 according to La doping concentration.

An XRD analysis was performed to confirm whether a calcined composite metal oxide powder had an intended phase. FIG. 1 shows an XRD pattern of the calcined composite metal oxide powder. The calcined composite metal oxide powders obtained in Examples 1 to 7 were all confirmed to have a scheelite phase. However, a little amount of the secondary phase was detected in all of the calcined composite metal oxide powders obtained in Examples 1 to 7, and as the amount of La as a dopant increased, the peak of the secondary phase became higher. The composition of the secondary phase was $La_2Mo_2O_9$. However, as shown in FIG. 2, the effect of the $La_2Mo_2O_9$ phase on the electric characteristics of a specimen is not significant. FIG. 2 shows a Scanning Electron Microscope ("SEM") image of calcined composite metal oxide powder ($Sr_{0.70}La_{0.30}MoO_4$) obtained in Example 4. The composition described in FIG. 2 was obtained by an analysis of Energy Dispersive Spectrometer ("EDS"). As shown in FIG. 2, La-rich phases, i.e., $La_2Mo_2O_9$ phases are not connected to each other but are present sporadically on the grain boundary of $SrMoO_4$-based grains. FIG. 3 shows a graph illustrating the volume of a crystal lattice calculated from the peak location of an XRD pattern of FIG. 1 according to La doping concentration. As shown in FIG. 3, the volume rapidly decreases until x=0.2, and then slowly until x=0.4. This indicates that doping can be performed well on the crystal lattice of $SrMoO_4$ until La=0.2, but only part of La can be doped and the rest of La cannot be doped when La has a higher content. The secondary phase is formed by the undoped La.

Electric Conductivity

Figure 4:
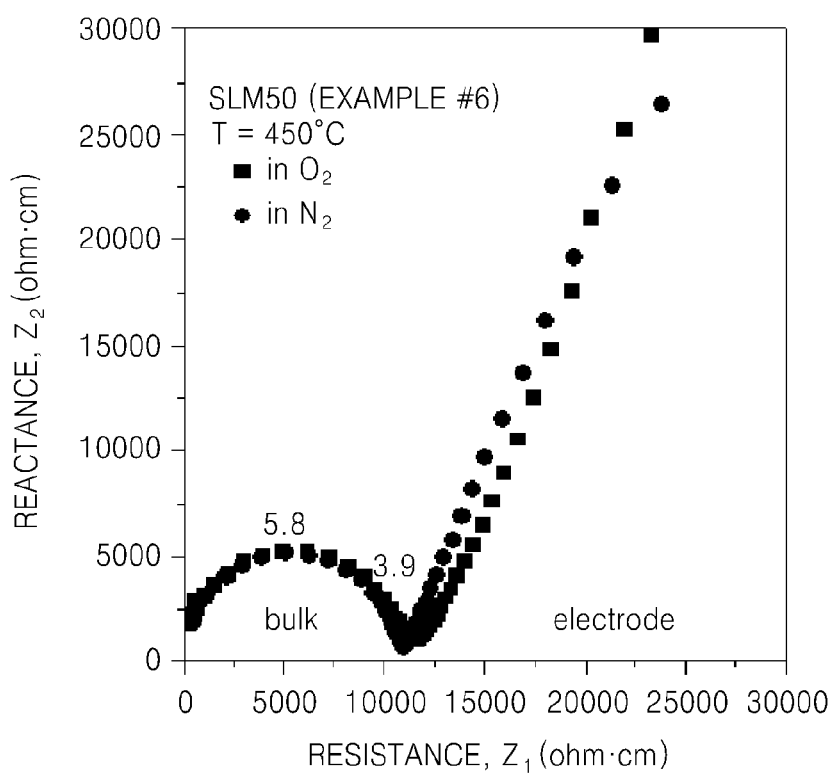
FIG. 4 is a graph of reactance $Z_2$ (ohm·cm) versus resistance $Z_1$ (ohm·cm) showing an impedance pattern of sintered composite metal oxide pellet ($Sr_{0.50}$ $La_{0.50}$ Mo $O_4$:SLM50) obtained in Example 6 measured via 2-probe AC method.

An impedance pattern of the sintered composite metal oxide pellet ($Sr_{0.50}La_{0.50}MoO_4$:SLM50) obtained in Example 6 was measured according to the 2-probe AC method and the result is shown in FIG. 4. In FIG. 4, the semicircle region (high frequency region) indicates an impedance pattern generated by the resistance of a specimen. That is, the diameter of the semicircle is the resistance of the specimen. The subsequent linear region (low frequency region) indicates a pattern corresponding to the resistance of an electrode. In FIG. 4, figures are represented in log (frequency) value. What is to be noted in FIG. 4 is a size of the semicircle according to a gas atmosphere. As shown in FIG. 4, the change in a gas atmosphere did not change the size of the semicircle, which indicates that the charge carrier of the specimen is not electrons but oxygen ions. This is because the electronic conduction in oxides generally depends on oxygen partial pressure. In general, oxygen ion conductivity is independent of an oxygen atmosphere.

Figure 5:
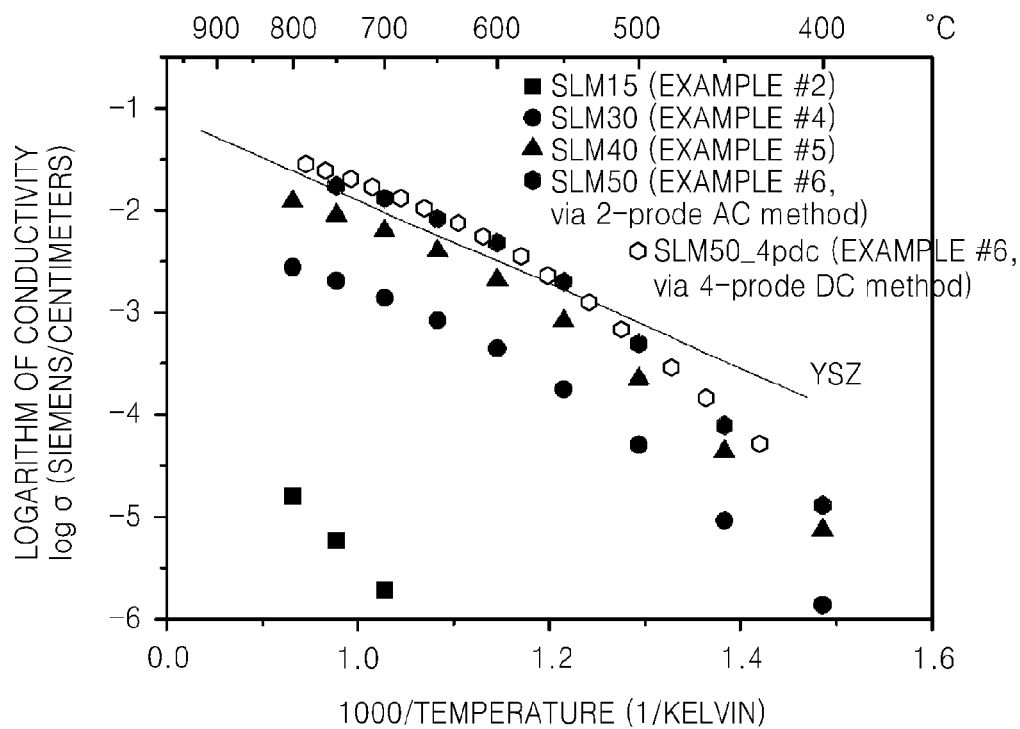
FIG. 5 is a graph of the logarithm of conductivity (Siemens per centimeter, S/cm) versus the inverse of temperature (1/Kelvin, 1/K) showing conductivity according to the temperature of sintered composite metal oxide pellets obtained in Example 2 ($Sr_{0.85}$ $La_{0.15}$ Mo $O_4$:SLM15), Example 4 ($Sr_{0.70}$ $La_{0.30}$ Mo $O_4$:SLM30), Example 5 ($Sr_{0.60}$ $La_{0.40}$ Mo $O_4$:SLM40) and Example 6 ($Sr_{0.50}$ $La_{0.50}$ Mo $O_4$:SLM50) measured via 2-probe AC method and 4-probe DC method.

The conductivity according to the temperature of the sintered composite metal oxide pellets obtained in Example 2 ($Sr_{0.85}La_{0.15}MoO_4$:SLM15), Example 4 ($Sr_{0.70}La_{0.30}MoO_4$:SLM30), Example 5 ($Sr_{0.60}La_{0.40}MoO_4$:SLM40), and Example 6 ($Sr_{0.50}La_{0.50}MoO_4$:SLM50), measured via the 2-probe AC method and 4-probe DC method, is shown in FIG. 5. The conductivity of each specimen increased as the amount of the dopant (La) increased. This is because La was incorporated into an Sr position, thereby, interstitial oxygen was introduced to provide the electroneutrality of the specimen, and the amount of the interstitial oxygen increased in proportion to the amount of La. The ion conductivity of yttria stabilized zirconia ("YSZ") shown in Table 5 was cited from "S. Skinner, Materials Today, 2003, pp. 30-37". Surprisingly, the conductivity of SLM50 was shown to be comparable to that of YSZ, the representative solid electrolyte material of an SOFC. As confirmed by the impedance measurement according to a gas atmosphere, the conductivity is ion conductivity. The high conductivity of SLM50 is quite unexpected considering that the conductivity is ion conductivity.

Figure 6:
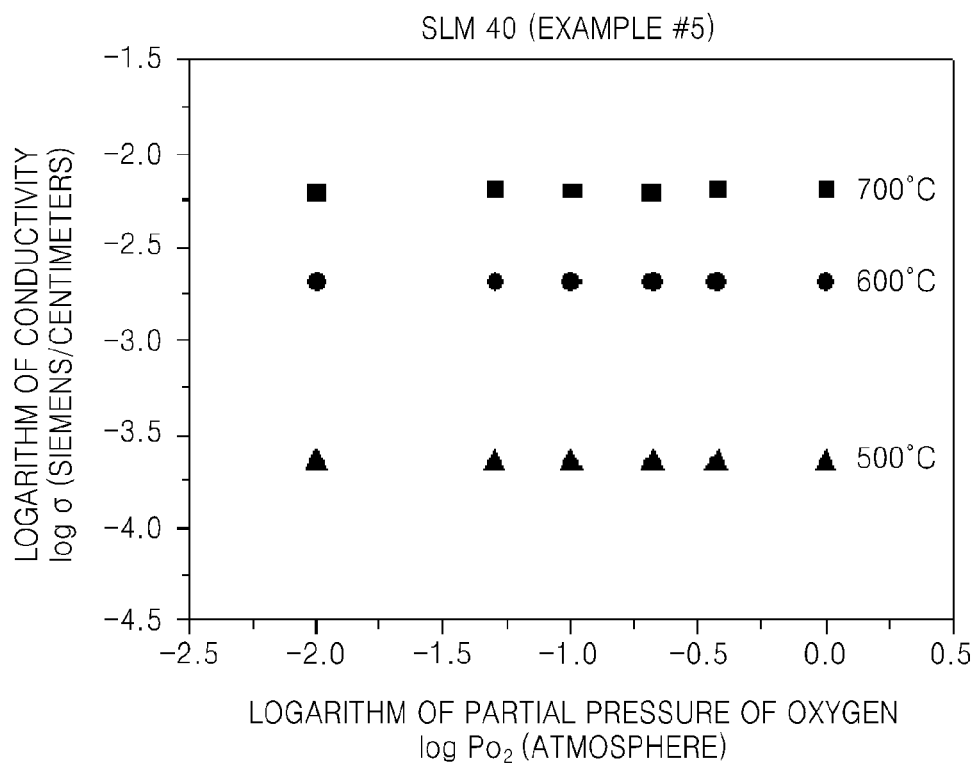
FIG. 6 is a graph of the logarithm of conductivity (Siemens per centimeter, S/cm) versus the logarithm of the partial pressure of oxygen (atmosphere, atm) showing the conductivity of SLM40 according to oxygen partial pressure.

The conductivity of SLM40 according to oxygen partial pressure is shown in FIG. 6. As shown in FIG. 6, the change in oxygen partial pressure did not affect the conductivity. From this, it can be speculated that the conductivity of the composite metal oxide of the present disclosure is ion conductivity.

Figure 7:
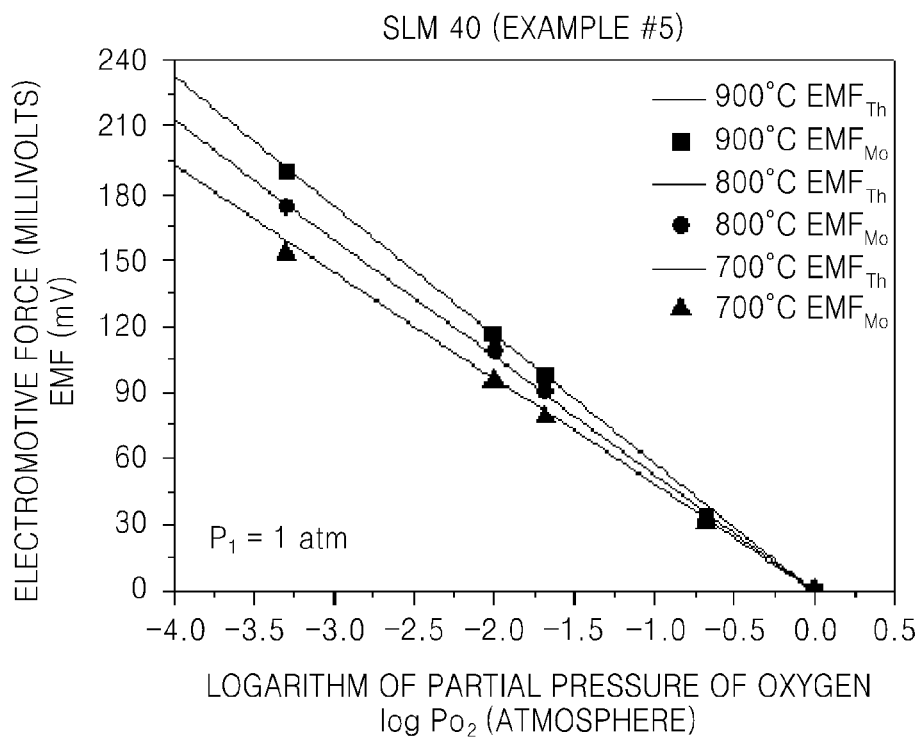
FIG. 7 is a graph of electromotive force (millivolts, mV) versus the logarithm of the partial pressure of oxygen (atmosphere, atm) showing the result of electromotive force ("EMF") measurement of SLM40.
Figure 8:
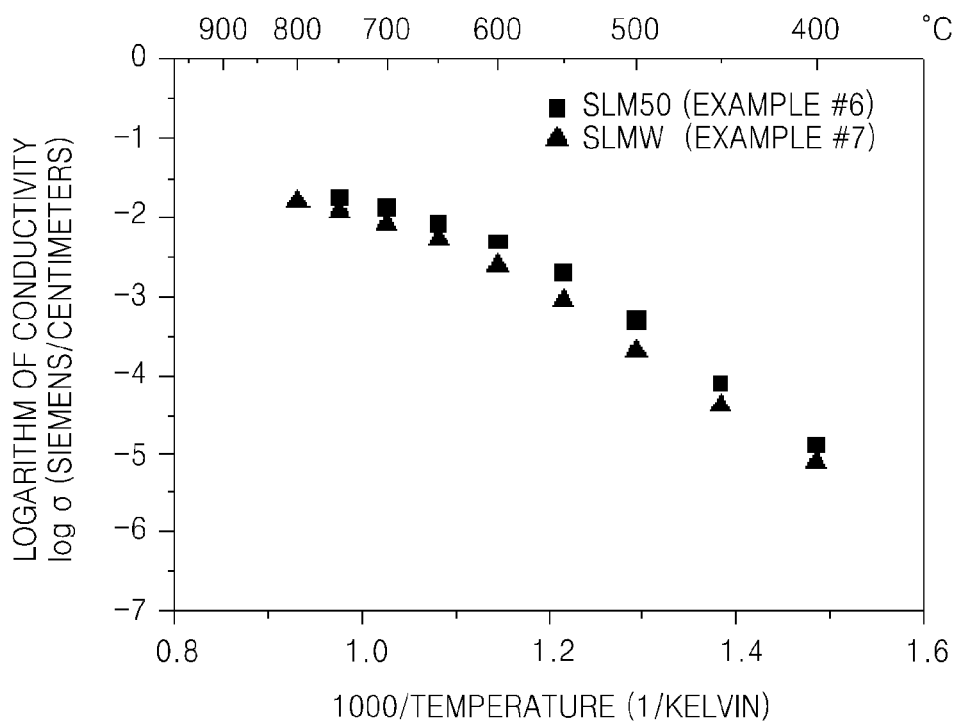
FIG. 8 is a graph of the logarithm of conductivity (Siemens per centimeter, S/cm) versus the inverse temperature (1/Kelvin, 1/K) showing the result of conductivity according to temperature measured for SLM50 and SLMW specimens.

FIG. 7 is a result of EMF measurements of SLM40. As shown in FIG. 7, as P2 decreased (i.e., as the difference between P1 and P2 increases) the EMF value increased. Further, the EMF value matched well with the theoretical value of the specimen having ionic conductivity. The solid lines in FIG. 8 represent theoretical values. Based on these results, it was confirmed that the charge carrier of the specimen is oxygen ion.

FIG. 8 shows the result of conductivity according to temperature measured for SLM50 and SLMW specimens. From FIG. 8, it was confirmed that the replacement of Mo, a hexavalent element, with W, another hexavalent element, still resulted in excellent conductivity.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A composite metal oxide represented by the formula

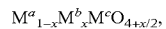

wherein
$M^a$ is at least one element selected from alkaline earth metals,
$M^b$ is at least one element selected from lanthanoids,
$M^c$ is at least one element selected from Mo and W, and
x is from about 0.1 to about 0.5,
wherein a volume of a crystal lattice of the composite metal oxide is less than a volume of a crystal lattice of a composite metal oxide of the formula $M^a_{1-x}M^b_xM^cO_{4+x/2}$ wherein x is 0.

2. The composite metal oxide according to claim 1, wherein $M^a$ is at least one element selected from Ca, Sr, and Ba.

3. The composite metal oxide according to claim 1, wherein $M^b$ is at least one element selected from La, Pr, Nd, Sm, Eu, and Gd.

4. The composite metal oxide according to claim 1, wherein the composite metal oxide comprises a scheelite structure.

5. A solid electrolyte layer comprising a composite metal oxide represented by the formula

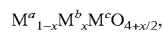

wherein
$M^a$ is at least one element selected from alkaline earth metals,
$M^b$ is at least one element selected from lanthanoids,
$M^c$ is at least one element selected from Mo and W, and
x is from about 0.1 to about 0.5,
wherein a volume of a crystal lattice of the composite metal oxide is less than a volume of a crystal lattice of a composite metal oxide of the formula $M^a_{1-x}M^b_xM^cO_{4+x/2}$ wherein x is 0.

6. A reaction barrier layer comprising the composite metal oxide of claim 1.

7. A fuel cell comprising
a cathode,
a solid electrolyte layer,
an anode,
optionally a first reaction barrier layer disposed between the cathode and the solid electrolyte layer, and
optionally a second reaction barrier layer disposed between the anode and the solid electrolyte layer, wherein at least one of the cathode, the solid electrolyte layer, the anode, the first reaction barrier layer, and the second reaction barrier layer comprises a composite metal oxide represented by the formula $$M^a{}_{1-x}M^b{}_xM^cO_{4+x/2},$$

wherein $M^a$ is at least one element selected from alkaline earth metals, $M^b$ is at least one element selected from lanthanoids, $M^c$ is at least one element selected from Mo and W, and x is from about 0.1 to about 0.5, wherein a volume of a crystal lattice of the composite metal oxide is less than a volume of a crystal lattice of a composite metal oxide of the formula $M^a{}_{1-x}M^b{}_x M^cO_{4+x/2}$ wherein x is 0.

8. The composite metal oxide of claim 4, wherein the composite metal oxide comprises irregular tetrahedra of the formula $M^cO_4$.

* * * * *